United States Patent
Kim et al.

(10) Patent No.: US 6,249,009 B1
(45) Date of Patent: Jun. 19, 2001

(54) RANDOM NUMBER GENERATOR

(76) Inventors: Hong J. Kim, 2232 Durant Ave. apt.#305, Berkeley, CA (US) 94704; Michael J. Klass, 2509 Tarmalpais Ave., El Cerrito, CA (US) 94530

(*) Notice: Subject to any disclaimer, the term of this patent is extended or adjusted under 35 U.S.C. 154(b) by 0 days.

(21) Appl. No.: 08/876,994

(22) Filed: Jun. 16, 1997

(51) Int. Cl.[7] .................................................... G01R 1/02
(52) U.S. Cl. ............................................................ 250/580
(58) Field of Search .................................. 250/580, 591; 380/255, 21; 708/250

(56) References Cited

U.S. PATENT DOCUMENTS

| | | | |
|---|---|---|---|
| 4,547,670 | * 10/1985 | Sugimoto et al. | 250/591 |
| 4,641,102 | 2/1987 | Coulthart et al. | 328/62 |
| 4,855,690 | 8/1989 | Dias | 331/78 |
| 4,886,958 | * 12/1989 | Merryman et al. | 250/492.2 |

FOREIGN PATENT DOCUMENTS 0 828 349  3/1998  (EP) ................................ H03K/3/84

OTHER PUBLICATIONS

Matthews, "It's a lottery," *New Scientist,* Jul. 22, 1995, pp. 38–42.

Houard, "Classical limit and quantum measurements in the detection of photons," *Physical Review A,* vol. 54, No. 6, Dec. 1996, pp. 4719–4740.

Hariharan, et al., "Ultra–high–frequency beats produced by laser modes at the single–photon level," *Journal of Modern Optics,* 1995, vol. 42, No. 3, pp. 565–567. No Month.

Bennett, et al., "Quantum Cryptography," *Scientific American,* Oct. 1992, pp. 50–57.

Matsuo, et al., Thomas point process in pulse, particle, and photon detection, *Applied Optics,* Jun. 15, 1983, vol. 22, No. 12, pp. 1898–1909.

Saleh, et al., Multiplied–Poisson Noise in Pulse, Particle, and Photon Detection, *Proceedings of the IEEE,* vol. 70, No. 3, Mar. 1982, pp. 229–245.

Rarity, "Quantum Cryptography and Quantum Computation," *Conference on Lasers and Electro–Optics Europe— Technical Digest,* 1996, p. 36 JMA3. No Month.

Article from Applied Optics, vol. 22, No. 12, Jun. 15, 1983, by Kuiaki matsuo, et al., "Thomas point process in pulse, particle, and photon detection."

(List continued on next page.)

*Primary Examiner*—James W. Davie
(74) *Attorney, Agent, or Firm*—Skjerven Morrill MacPherson LLP

(57) ABSTRACT

A random number generator comprises a laser for generating photons, an assembly of neutral density filters to attenuate the photons to an average of number of photons detected and to detect the average number of photons during each interval in a series of like time intervals, a photomultiplier tube to detect the occurrence of a fraction of the attenuated photons during a set length of time, and a clock and shift register to record a first value for detection of any photons during a selected single time interval in the series of time intervals, and to record a second value for detection of less than the average number of photons during the selected single time interval. The values recorded in the shift register for the series of time intervals are a string of truly random numbers.

32 Claims, 1 Drawing Sheet

OTHER PUBLICATIONS

Article from *Proceedings of the IEEE,* vol. 70, No. 3 Mar. 1982, by Bahaa E. A. Seleh and Malvin Carl Teich, "Multipled–Poisson Noise in Pulse, Particle, and Photon Detection."

Article obtained on–line, no date, by Lyman Page / page@pupgg.princeton,edu, "interference of a Single Photon." (No date).

S. Takeuchi et al.: "High Performance Random Pulser Based on Photon Counting," *IEEE Transactions on Nuclear Science,* vol. NS–33, No. 1, Feb. 1986, pp. 946–949, XP002022448.

Halling et al.: "Random pulse–burst etc." *Nuclear Instruments and Methods.,* vol. 93, No. 1, May 1971, pp. 171–172, XP002075238 Bad copy.

Dillard et al.: "An electronic generator etc." *IRE Transactions on Electronic Computers.,* vol. ec–11, No. 2, Apr. 1962, p. 284, XP002075239 Bad copy.

* cited by examiner

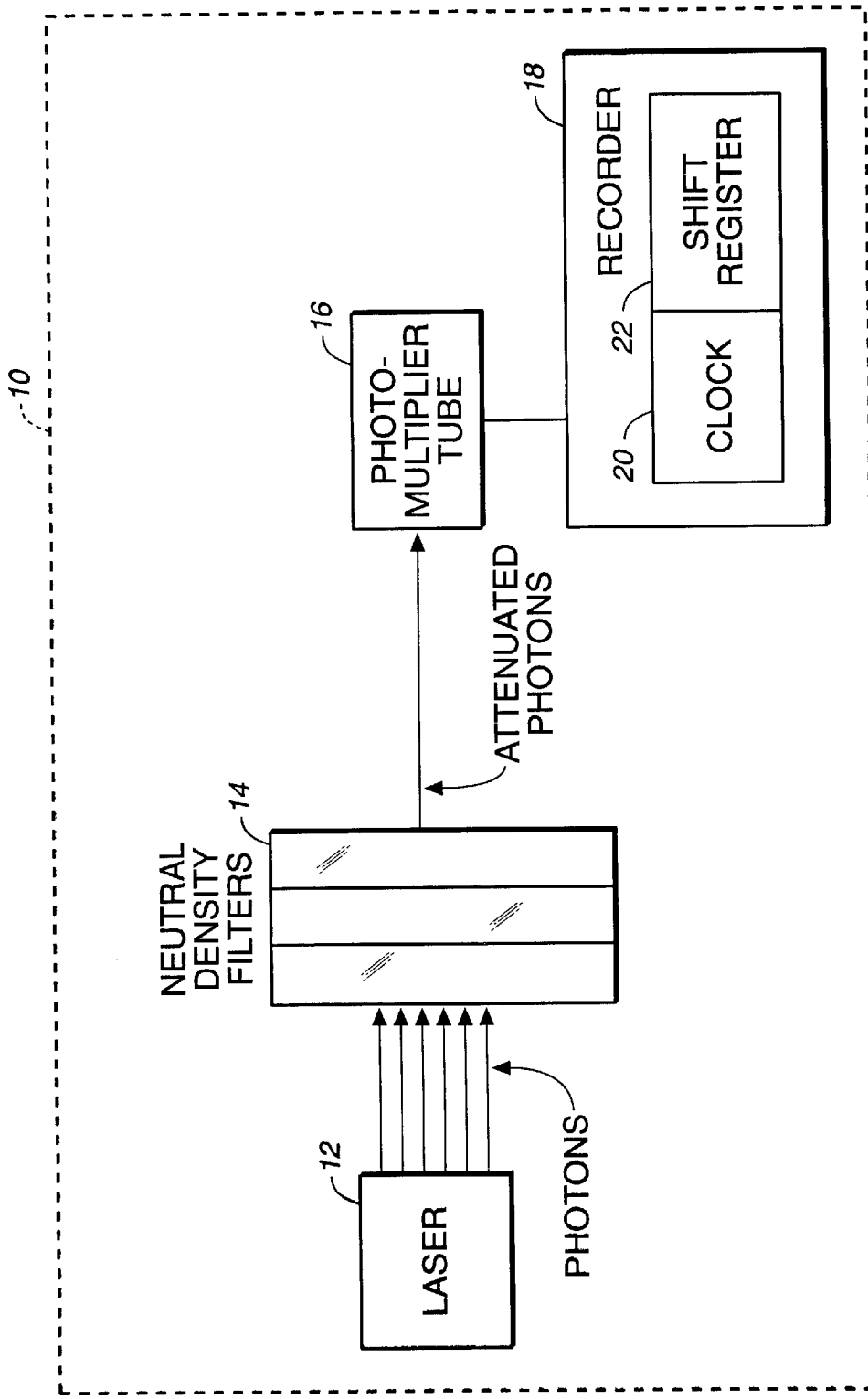
FIG._1

RANDOM NUMBER GENERATOR

BACKGROUND OF THE INVENTION

1. Field of the Invention

This invention relates to random number generators and in particular to random number generators based on detection of quantum phenomena. This invention also relates to random number generators based on detection of photons. The invention further relates to a method of generating random numbers based on detection of quantum phenomena, and particularly, based on detection of photons.

2. Description of the Related Art

A random number generator is a device which produces random numbers or numbers that are nearly random. A number that is random is one that has no "memory" of what has gone before it. It has proved to be very difficult to produce truly random numbers. While people may be capable of producing random numbers by picking numbers out one at a time, they cannot do so fast enough to meet the requirements of modern usage. Therefore, for all practical purposes, machines are used to produce random numbers.

Most machines and methods heretofore employed for producing random numbers are either "deterministic"—they follow a fixed, totally predictable recipe—or are not truly random. Some few devices produce truly random numbers, but they are subject to being skewed by external influences or are very delicate and expensive to maintain. For many purposes an approximation of randomness has turned out to be acceptable. For an increasing number of others, true randomness is a necessity.

Random numbers are most commonly thought of as having security applications such as for sending encrypted messages. Random numbers are useful for security purposes because they create inherently unpredictable sequences which cannot be easily duplicated, studiously replicated or discovered by accident. For many lower security applications, a random number generator with a reasonable degree of randomness will suffice. Higher security applications demand a greater degree of true randomness. That this is true was dramatically illustrated in 1991 during the attempted coup in the Soviet Union when American cryptologists were able to decipher communications between high level Soviet officials using the most sophisticated Soviet cipher equipment. In another demonstration of the vulnerability of modern ciphers, in January 1997 a university student was able to crack a 40 bit security code in just three and one-half hours by testing 100 billion possible solutions to the code per hour.

Another problem that exists with current random number generators, apart from the level of "randomness" of the numbers that they are able to produce, is that sufficient numbers of random numbers cannot be produced quickly enough for contemporary applications. This is significant in security applications where messages are encoded with a string of random numbers by adding a bit in the string to each bit in the message. The result appears to be nonsense to any recipient until it is decoded by subtracting out the string to recover the message. Ideally, the random number string should be as long as the message itself In practice, a string—known as a "key"—is used repeatedly and it is hoped the string cannot be discovered. The length of the key is critically important because each additional random bit in the string doubles the security level of the cipher. Naturally, if production of sufficient numbers of random numbers was possible and practical, the level of security enjoyed for encrypted messages would increase exponentially.

In addition to security applications, random numbers are increasingly essential for scientific investigations including studies of physical laws, investigations and constructions of probability distributions, analyses of the performance of mathematical algorithms in principle as applied practically to devices, and notably for development of artificial intelligence. Random number generators are used in the assessment of the performance of machines to help construct a large variety of representative situations. The sampling thus obtained provides feedback which is used to learn more about the process or operation being studied. As with security applications, problems exist regarding the availability of a sufficient volume of random numbers and with the true randomness of the numbers produced. In a growing number of areas of scientific inquiry, the ability to produce large numbers of random numbers can be critical. Certain research, such as large-scale Monte Carlo simulations, requires millions of random numbers to yield useful information. In sensitive analyses where true randomness in a sampling is necessary to obtain sound results, any lack of randomness can unacceptably skew test data and frustrate the research.

In part due to the need for large numbers of random numbers, the technique of producing "pseudo-random" numbers evolved. Pseudo-random numbers are generated using an arithmetical algorithm having an output of numbers which can pass most statistical tests of randomness. Another important aspect of arithmetically produced random numbers is that they can be replicated. This is useful for purposes of testing and analyses, but potentially disastrous for security applications. While pseudo-random numbers are statistically random for most applications, and have the application specific advantage of being reproducible, they suffer from one major flaw—they repeat. For example, a popular pseudo-random number generator is the linear-congruential generator which is based on a three step algorithm. The linear-congruential generator produces integers less than m. At some point, if the generator is asked to produced m+1 numbers, it must repeat itself at least once. Since each integer produced by the generator is based on the same algorithm, and is therefore dependent on the preceding number, this leads into a cycle of repetition that the generator cannot escape. In this sense, each pseudo-random number generator has a period. The best linear-congruential generators have a period exceeding 2 billion. Shift-register algorithms have been used to greatly extend the period of the generator. Even so, the fact remains that, regardless of the length of the period of a pseudo-random number generator, the numbers which are the product of the technique are ultimately deterministic and not truly random.

Most machines are understood to function in the realm of classical mechanics according to the physical laws stated by Newton. Since, under Newtonian physics, a machine powered by a constant force or having a constant velocity can only yield a constant measurement of the values of its physical characteristics, generation of random numbers is in principle impossible. In the essence of the concept, any object can be described and its physical nature predicted if its initial conditions are known. It is therefore ultimately deterministic and incapable of truly random behavior.

Moving closer to the observation of quantum phenomena, many devices have been constructed that take sample measurements of a stochastic physical process. The measurements are converted into a sequence of random elements, each element having no memory of any of its predecessors. Production of random numbers from a physical process creates a string of random numbers that is not repeatable.

This lack of repeatability is a liability in scientific applications where it is desirable to replicate experimental results based on a given string of random numbers. Conversely, lack of repeatability is not necessarily a disadvantage and may well be an asset in security applications and the investigation of artificial intelligence.

Random or nearly random numbers can be generated using "noise" created by minor fluctuations in electronic circuits. It is disputed whether such electronic noise devices generate true random numbers. Unfortunately, they are often innately slower than pseudo-random number generators making them unsuitable for any application where a substantial quantity of random numbers is required. Another drawback to noise based random number generators is that their delicate construction requires constant, minute checking to verify that the device has not skewed away from producing true randomness. Electronic noise devices can become unstable over time. Noise levels can also be affected by fluctuations in temperature and line voltage. Lastly, such devices are very sensitive to surrounding electromagnetic fields so that any fluctuation in nearby electromagnetic fields can change the output of the device in a deterministic way thereby skewing the noise away from randomness.

Random numbers can be produced by monitoring radioactive decay. Such devices produce truly random results as opposed to electronic noise devices. However, radioactive materials must be shielded and are therefore inappropriate for many locations, such as personal computers. As with noise based devices, radioactive decay devices produce random numbers at unacceptably slow rates.

Recently there have been advances in production of random numbers using spatially stochastic processes. Using a two-dimensional position-sensitive photon-counting detector, the locations of detected photoevents on the two-dimensional detector are tracked. A random sequence of numbers is produced based upon the location (not the time) of photoelectrons emitted from a photocathode. While promising, random number generation based on photoevent locations suffers from an number of vexing problems. The photoevent random number generator is large in size, making it impractical for many applications. It is also complicated to set up and is dependent on position resolution, speed and dead time.

Other advances in related fields have focused on the polarized nature of light. Photons have many different polarizations. If a photon is passed through a birefringent crystal, such as calcite, the photon will pass straight through the crystal if it is polarized perpendicular to the optic axis of the crystal. If the photon entering the crystal is already polarized along the axis of the crystal, it will emerge with the same polarization but be shifted to a different path than the photons with perpendicular polarization. The photons that have emerged from the crystal can be detected using detectors, such as photomultiplier tubes, established in the two respective paths. If a photon is incident on the crystal with a polarization that is not one of the two rectilinear directions, that is, either parallel or perpendicular to the optic axis of the crystal, the polarization of the photon will be repolarized into one of the two rectilinear directions. If a photon enters the crystal with an axis of polarization halfway between the two rectilinear directions, it will be randomly repolarized into either rectilinear path with equal probability. These repolarized photons lose all "memory" of their original diagonal polarization. The randomization of the diagonally polarized photons has been utilized by quantum cryptographers to advance a clever scheme for secure exchange of a secret random key that can subsequently be used to send secret messages. An essential part of the scheme is to thwart eavesdroppers to the message using the random repolarization of incident photons having polarizations diagonal to the optic axis of the crystal. Any measurements by the eavesdropper of such photons would repolarize them and erase the message content inherent in their original polarizations. Interestingly, the possibility of generating random numbers using the random repolarization of incident photons having diagonal polarizations has attracted very little attention.

SUMMARY OF THE INVENTION

This invention takes advantage of the peculiar nature of quantum phenomena, such as photons and electrons, as explained and understood under the laws of quantum mechanics. Quantum phenomena have what is known as a "wave-particle duality" wherein they exhibit characteristics of either waves or of particles depending on the measurements performed on them. Thus, when a measurement is performed on a quantum phenomenon to establish its state, the quantum phenomenon loses its "memory" of its original condition or state. As explained below, the impossibility of predicting the future state of quantum phenomena makes possible the generation of random numbers.

A random number generator according to the invention comprises a generator of quantum phenomena, an attenuator of the quantum phenomena, a detector, and a recorder. It is most convenient to generate quantum phenomena by producing photons using a laser, but it should be recognized that the invention could comprise other quantum phenomenon generators such as a cathode emitter for electrons. Photons generated by the laser are directed towards an attenuator to reduce the quantity of photons exiting the attenuator to a desired number. The power of the laser and the reduction ability of the attenuator are coordinated to produce an average number of photons during an established time interval.

A detector receives the photons from the attenuator. The detector is capable of recognizing a certain minimum threshold number of photons. In the preferred embodiment, the detector is capable of recognizing one photon. The detector is connected to a recorder comprising a clock and a shift register. The speed of the clock is set to twice the established time interval. If the laser and attenuator are coordinated to produce an average of one photon during a set time interval, the clock is set to twice that interval. This splits the interval into a first half and a second half, each half having, on average, a fifty percent probability of detection of a photon. Since the probability of each photon departing the attenuator is statistically identical and independent, for each time interval it is purely random whether a photon will be detected in the first half or in the second half of the interval. There is thus a fifty percent probability of detection of a photon and a fifty percent probability of no detection of a photon during each half interval. Assigning values of zero for no detection of a photon, or the value of one for detection of at least one photon, generates a string of random numbers. The random numbers are directed to the shift register as they are produced.

As can be seen, a primary object of the invention is to provide a random number generator based upon detection of quantum phenomena. Another object of the invention is to provide a random number generator based upon detection of randomly occurring photons. A further object of the invention is to provide a random number generator based upon detection of a randomly occurring minimum threshold number of quantum phenomena, including in particular, a minimum threshold number of photons. Another object of the invention is to provide a random number generator based on detection of randomly occurring quantum phenomena during each of a series of temporal intervals. A still further object of the invention is to provide a random number generator based on detection of at least a single photon during each of a series of temporal intervals.

BRIEF DESCRIPTION OF THE DRAWINGS

FIG. 1 is a schematic diagram of a random number generator according to the invention.

DESCRIPTION OF THE PREFERRED EMBODIMENT

A random number generator according to the invention is generally depicted in FIG. 1. In the preferred mode, the device 10 comprises a laser 12 to generate photons. Photons are a convenient quantum media and can be easily produced. Any common light source can generate photons, but a laser will be more likely to produce a constant, even flow of photons. An alternative embodiment of the invention could use any source of any kind of photons with a frequency high enough to be detected by a photon detector. Most lasers obviously produced a great many photons. Other photon generators could include any LED, or any source of x-rays. Single photons can be produced using a spectrometer or an ultra-high frequency helium-neon laser. It should be understood that the device also could be constructed using a generator of other kinds of quantum phenomena. For example, any source of electrons, such as cathode emissions of electrons, could be used. An alternative embodiment of the invention comprises a cathode emitter for generation of free electrons. In the best mode, a one milliwatt helium-neon laser 12 is used to generate ~$3\times10^{15}$ photons every thirtieth of a second. The laser 12 has the additional advantage of not being acutely sensitive to minute fluctuations in surrounding electro-magnetic fields. Despite any such fluctuations, the laser will generate a satisfactorily uniform output of photons.

To utilize the random behavior of photons, the number of photons produced by the laser must be attenuated. If in another embodiment a spectrometer is used to generate single photons, no attenuation is necessary. But, in the preferred embodiment, photons are attenuated using an assembly of neutral density filters 14. Given the generation of ~$3\times10^{15}$ photons by the laser 12, neutral density filters 14 with a combined optical density of 10.3 achieve an attenuation factor of ~$5\times10^{-11}$ to reduce the photon output to an average number of 150,000 photons every second with a mean distance between photons of 2 km. This attenuation factor is achieved mostly by reflection and to a much smaller degree by absorption with the optical density D of the neutral density filters 14 defined as $$D = \log_{10}\left(\frac{I_O}{I_T}\right)$$

with $I_O$ representing the incident intensity of the light while $I_T$ represents the transmitted intensity of the light. The attenuation factor is reached in the best mode using an assembly of two neutral density filters each having an optical density of 5.0 and a third filter having an optical density of 0.3, such as are available from Reynard Corporation. Any other combination of neutral density filters achieving the requisite attenuation could be used, provided that multiple reflections are not permitted to occur between the individual filters. For example, in another embodiment, five neutral density filters each having an optical density of 2.0 are used in combination with a neutral density filters having a 0.3 density. It should be clear that any optical filters capable of attenuating the photons from the generator to the requisite degree could be used. In another embodiment, multiple plate polarizers are used to achieve the same attenuation factor as in the best mode. In the embodiment wherein free electrons are generated, a thin metal plate having applied to it a constant source of electric charge in a vacuumed housing attenuates the electrons.

As seen in FIG. 1, the photons transmitted from the neutral density filters 14 are detected using a photomultiplier tube 16 such as manufactured by Hamamatsu Corporation. The photons generated by the laser 12 have a wavelength of 632.8 nanometers. The photomultiplier tube 16 is capable of detecting photons of that specific wavelength. In the preferred embodiment, the photomultiplier tube 16 is able to detect a single photon. The photomultiplier tube has a quantum efficiency of 0.2. It can be appreciated that any photo detector capable of reliably detecting a single photon could be employed in place of a photomultiplier tube, bearing in mind that different photo detectors will have different levels of quantum efficiency. In an alternative embodiment, an avalanche photo diode replaces the photomultiplier tube 16. In the embodiment based on generation of free electrons, an electron multiplier tube acts as the detector.

If the problem of how many photons will emerge from the neutral density filters is given a quantum mechanical treatment, it is well understood that each photon incident on the neutral density filters will have a certain finite probability of being transmitted to the other side of the filters. On average the laser 12, assembly of neutral density filters 14, and photomultiplier tube 16 will detect 1,000 photons every thirtieth of a second. This translates to, on average, one photon every thirty-thousandth of a second. (Incident number of photons×attenuation factor×quantum efficiency of photomultiplier tube ≈average number of photons detected.) Given the quantum nature of photons, there is a finite probability for each photon of reflection from the neutral density filters 14, a finite yet small probability of absorption in the filters 14, and a finite probability of transmission through the filters 14. Whether each photon will be transmitted, absorbed or reflected is purely random and the probability of transmission for each photon is statistically identical and independent. It is entirely random therefore when during the 1/30,000 second interval the average of a single photon will be detected. The detection therefore of the average of a single photon during each interval is identical and independent. Considering that there will be an average of one photon detected every 30,000th of a second, this means that there will sometimes be zero photons, sometimes there will be one photon, and sometimes there will be more than one photon detected during the interval. Dividing the 30,000th of a second intervals in half yields intervals of 1/60,000 of a second during each of which there is a probability of fifty percent of detection of a photon and a probability of fifty percent of no detection of a photon with the possibility that for any given two consecutive intervals there will be no detection of a photon. The probabilities of detection of one or more photons during each 1/60,000 second interval in a series of such intervals are statistically identical and independent.

As generally shown in FIG. 1, upon detection of a photon or multiple photons, the photomultiplier tube 16 creates an electronic pulse which is transmitted to a recorder 18. The recorder 18 comprises a clock 20 capable of measuring and sending a pulse between temporal intervals of $\frac{1}{60,000}$ of a second. Many clocks are capable of measuring this small of an interval. It is well known how to measure temporal intervals of much smaller intervals such as nanoseconds ($1\times10^{-1}$ second). The clock 20 tracks successive intervals. Detection of any photons during an interval is then recorded in a shift register 22. The shift register 22 shifts every 60,000th of a second according to the pulses generated from the clock 20. A value of zero is recorded if no photons are detected, a value of one is recorded if any photons are recorded. The shift register 22 in this manner collects a series of truly random zeros and ones at the rate of 60,000 per second.

The device 10 as described is capable of producing 60,000 random numbers per second. However, adjustments can easily be made to increase the number of photons transmitted through the neutral density filters 14 by either increasing the power of the laser or by decreasing the density of the neutral density filters. Photomultiplier tubes are available to detect single photons at least as frequently as 100,000,000 per second. It is therefore possible to produce at least as many as 100,000,000 random numbers per second using the same basic configuration as shown in FIG. 1. This rate of production is more than sufficient for all but the most demanding applications for random number generators using only a single device 10. For scientific calculations or other applications demanding billions of random numbers, several of the devices 10 can be combined each of which is capable of producing at least 100,000,000 random numbers per second. In an alternative embodiment, an avalanche photodiode is used which is capable of detecting in excess of 1 billion single photons per second with a clock and shift register capable of recording in excess of 1 billion values per second.

While it is anticipated that the preferred detection probability will be fifty percent, that percentage can be adjusted according to the needs of the application by changing the photon output of the laser, changing the attenuation factor of the attenuation assembly, changing the detection efficiency of the photomultiplier tube, or modifying the speed of the clock. In this manner, the probability distribution of the numbers produced by the device will be altered, but each number produced will still be statistically independent and identical and truly random.

The random number generator as illustrated is less apt to be affected by changes in surrounding temperature and line voltage than other physical random number generators giving it a stability allowing its use in a wide variety of applications.

In an alternative embodiment of the invention, the neutral density filters 14 are coordinated with the laser 12 to increase the average transmission of photons through the filters 14 by a power of five to a transmission rate of $N=1\times10^8$ photons per $\frac{1}{150}$ second. A photodetector is used which can detect $1\times10^8$ photons per 1/150 second with an error factor of 10,000 photons (square root of N). Because the populations of photons attenuated by the neutral density filters 14 are Poisson distributed, an error factor of less than the square root of N effectively eliminates the possibility of any deterministic element of the detector affecting the true randomness of the outcome of the detection. The photodetector is calibrated to detect a minimum threshold of $1\times10^8$ photons every $\frac{1}{150}$ second. Given the quantum flux of the random photon emissions from the filters 14, there is a biased probability of detection of the minimum threshold of photons and a biased probability of not detecting the minimum threshold of photons. Similarly to the preferred embodiment, detection of the minimum threshold of photons is assigned a value of one, and failure during the interval to detect the minimum threshold of photons is assigned a value of zero. The assigned values are recorded in the shift register 22 to produce a sequence of numbers ($N_1, N_2, N_3, \ldots$). To produce a series of truly random numbers, the biased probability must be eliminated. Therefore, the sequence of numbers ($N_1, N_2, N_3, \ldots$) is grouped in sequential pairs. Paired numbers 0,0 and 1,1 are eliminated. Pairs (1,0) are assigned a value of 1 and pairs (0,1) are assigned a value of 0. By eliminating the pairs (0,0) and (1,1), the probability bias is removed, leaving the remaining pairs (1,0) and (0,1) each having a 50% probability of occurrence.

There have been thus described preferred and alternative embodiments of a random number generator. While preferred embodiments have been described and disclosed, it will be recognized by those with skill in the art that modifications are within the true spirit and scope of the invention. The appended claims are intended to cover all such modifications.

What is claimed is:

1. A random number generator comprising, generating means for generation of quantum phenomena, means for detection of a fraction of said generated quantum phenomena at a rate of an average number of quantum phenomena detected during a set length of time, and for detection of said average number of quantum phenomena during each time interval in a series of time intervals, valuation means for representing detection of at least said average number of quantum phenomena during a selected time interval in said series with a first value and for representing detection of less than said average number of quantum phenomena during the selected time interval with a second value, said valuation means generating a series of random numbers for each time interval in the series by determining the first value or the second value for that time interval.

2. The random number generator of claim 1 wherein said generating means includes means for attenuation of the quantum phenomena.

3. The random number generator of claim 1 wherein said time intervals of said series are of uniform length.

4. The random number generator of claim 3 including means for recording the value assigned for each said time interval in said series.

5. A random number generator comprising, generating means for generation of quantum phenomena, means for detection of a fraction of said generated quantum phenomena at a rate of an average number of quantum phenomena detected during a set length of time, and for detection of said average number of quantum phenomena during each time interval in a series of time intervals, valuation means for representing detection of at least said average number of quantum phenomena during a selected time interval in said series with a first value and for representing detection of less than said average number of quantum phenomena during the selected time interval with a second value, and wherein said time intervals in said series are of non-uniform length.

6. A random number generator comprising, generating means for generation of quantum phenomena, means for detection of a fraction of said generated quantum phenomena at a rate of an average number of quantum phenomena detected during a set length of time, and for detection of said average number of quantum phenomena during each time interval in a series of time intervals, valuation means for representing detection of at least said average number of quantum phenomena during a selected time interval in said series with a first value and for representing detection of less than said average number of quantum phenomena during the selected time interval with a second value, and means for recording the values assigned for each said time interval in said series.

7. A random number generator comprising, generating means for generation of quantum phenomena, means for attenuation of the quantum phenomena, means for detection of a fraction of said generated quantum phenomena at a rate of an average number of quantum phenomena detected during a set length of time, and for detection of said average number of quantum phenomena during each time interval in a series of time intervals, valuation means for representing detection of at least said average number of quantum phenomena during a selected time interval in said series with a first value and for representing detection of less than said average number of quantum phenomena during the selected time interval with a second value, said valuation means generating a series of random numbers for each time interval in the series by determining the first value or the second value for that time interval.

8. A random number generator comprising, generating means for generation of quantum phenomena, means for attenuation of the quantum phenomena, means for detection of a fraction of said generated quantum phenomena at a rate of an average number of quantum phenomena detected during a set length of time, and for detection of said average number of quantum phenomena during each time interval in a series of time intervals, valuation means for representing detection of at least said average number of quantum phenomena during a selected time interval in said series with a first value and for representing detection of less than said average number of quantum phenomena during the selected time interval with a second value, and means for recording the values assigned for each said time interval in said series.

9. The random number generator of claim 8 wherein said generating means includes means for generating photons.

10. The random number generator of claim 8 wherein said means for generating photons includes a laser.

11. The random number generator of claim 9 wherein said means for attenuation includes an assembly of neutral density filters.

12. The random number generator of claim 8 wherein said means for detection of quantum phenomena is capable of detecting a single quantum phenomenon.

13. The random number generator of claim 8 wherein said means for detection of quantum phenomena includes a photomultiplier tube.

14. The random number generator of claim 8 wherein said means for detection of quantum phenomena includes a photomultiplier tube capable of detecting a single photon.

15. The random number generator of claim 8 wherein said valuation means includes a clock and a shift register.

16. A random number generator comprising, a laser for generation of photons, means for attenuation of the photons generated by said laser, means for detection of a fraction of said generated photons at a rate of an average number of photons detected during a set length of time, and for detection of said average number of photons during each time interval in a series of time intervals, valuation means for representing detection of at least said average number of photons during a selected time interval in said series with a first value and for representing detection of less than said average number of photons during the selected time interval with a second value, said valuation means generating a series of random numbers for each time interval in the series by determining the first value or the second value for that time interval, and means for recording the values assigned for each said time interval in said series.

17. The random number generator of claim 16 wherein said means for attenuation of the photons includes means for attenuation to an average of one photon during a set length of time.

18. The random number generator of claim 16 wherein said means for attenuation includes neutral density filters.

19. A random number generator, comprising:

a laser for generation of photons;

means for attenuation of the photons generated by said laser, said means for attenuation of the photons including means for attenuation to an average of one photon during a set length of time;

means for detection of a fraction of said generated photons at a rate of an average number of photons detected during a set length of time, and for detection of said average number of photons during each time interval in a series of time intervals, said means for detection including means for detection at a rate of an average of one photon detected during a set length of time;

valuation means for representing detection of at least said average number of photons during a selected time interval in said series with a first value and for representing detection of less than said average number of photons during the selected time interval with a second value, said valuation means including means for representing detection of at least one attenuated photon during the selected time interval in said series with a first value and for representing detection of no attenuated photons during the selected time interval with a second value; and means for recording the values assigned for each said time interval in said series.

20. A random number generator comprising a laser for generation of photons, neutral density filters to attenuate the photons generated by the laser, a photomultiplier tube to detect a fraction of said generated photons at a rate of an average number of photons detected during a set length of time, and for detection of said average number of photons during each time interval in a series of time intervals, a clock, and a shift register to record a first value upon detection of at least said average number of photons during a selected time interval in said series and to record a second value upon detection of less than said average number of photons during the selected time interval.

21. The random number generator of claim 20 wherein, the neutral density filters attenuate the photons generated by the laser to a rate of an average of one photon detected during said set length of time, and said shift register records a first value upon detection of at least one photon during the selected time interval in said series of time intervals, and records a second value upon detection of no photons during the selected time interval.

22. A method for generating random numbers comprising generating quantum phenomena, attenuating the quantum phenomena, detecting a fraction of the attenuated quantum phenomena at a rate of an average number of quantum phenomena detected during a set length of time, detecting an average number of quantum phenomena during each time interval in a series of time intervals, assigning detection of said average number of quantum phenomena during a selected time interval with a first value, assigning detection of less than said average number of quantum phenomena during a selected time interval with a second half, and recording the values assigned to each time interval in said series of time intervals.

23. The method of claim 22 wherein quantum phenomena are generated by producing photons using a laser.

24. The method of claim 23 wherein the photons are attenuated with neutral density filters.

25. The method of claim 23 wherein the photons are detected with a photomultiplier tube.

26. The method of claim 25 wherein the photons are detected with a photomultiplier tube capable of detecting a single photon.

27. The method of claim 26 wherein the rate of detection of the photons is an average of one photon during said set length of time.

28. The method of claim 22 including, grouping the values assigned for said series into a series of contiguous, sequential pairs, discarding the pairs comprising two identical values, assigning pairs comprising said first value in a first position and said second value in a subsequent position with a third value, and assigning pairs comprising said second value in a first position and said first value in a subsequent position with a fourth value.

29. A method for generating random numbers comprising generating photons using a laser, attenuating the photons generated by the laser, detecting a fraction of the photons at a rate of detection of an average of one photon during a set length of time, detecting the occurrence of at least one photon during each time interval in a series of time intervals, assigning detection of at least one photon during a selected time interval in said series with a first value, assigning detection of no photons during said selected time interval in said series with a second value, and recording the values assigned for each time interval in said series of time intervals.

30. The method of claim 29 wherein the photons are attenuated using neutral density filters.

31. The method of claim 29 wherein detection of the occurrence of photons is made using a photomultiplier tube capable of detecting a single photon.

32. A method for generating random numbers comprising generating photons using a laser, attenuating the photons generated by the laser using an assembly of neutral density filters, detecting a fraction of said photons at a rate of an average of one photon detected during a set length of time, and detecting the occurrence of at least one photon during each time interval in a series of time intervals using a photomultiplier tube capable of detecting a single photon, assigning detection of at least one photon during a selected time interval in said series with a first value, assigning detection of no photons during the selected time interval in said series with a second value, and recording the values assigned for each time interval in said series of time intervals.

\* \* \* \* \*